S. S. Day,
Daguerreotype Plate-Holder,
No. 13,701.   Patented Oct. 23, 1855.

Witnesses:
Lemuel W. Serrell
Thomas G. Harold

Inventor:
S. S. Day

UNITED STATES PATENT OFFICE.

SAMUEL S. DAY, OF NEW YORK, N. Y.

IMPROVED DAGUERREOTYPE-PLATE VISE.

Specification forming part of Letters Patent No. 13,701, dated October 23, 1855.

*To all whom it may concern:*

Be it known that I, SAMUEL S. DAY, of the city, county, and State of New York, have invented, made, and applied to use certain new and useful Improvements in Daguerreotype-Plate Holders; and I do hereby declare that the following is a full, clear, and exact description of the construction and operation of the same, reference being had to the annexed drawings, making part of this specification, wherein—

Figure 1:
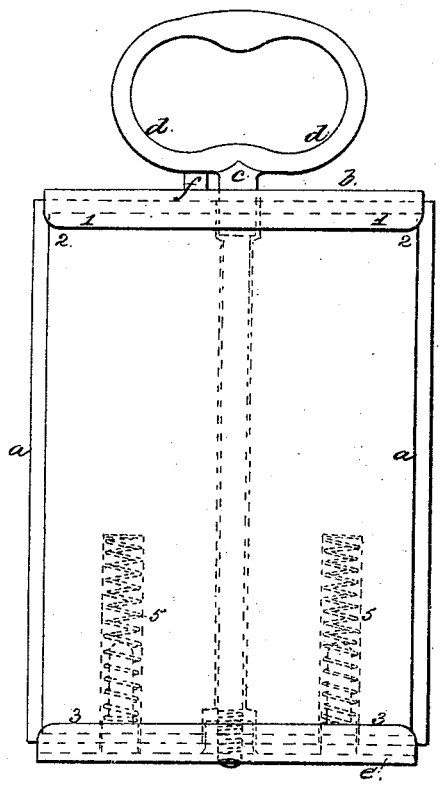
Figure 2:
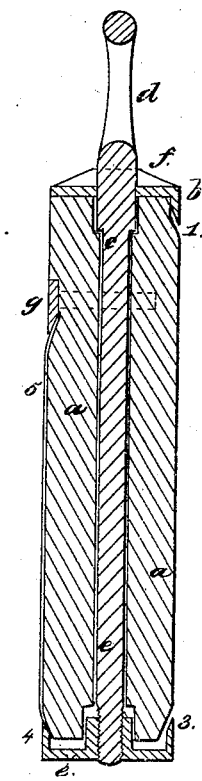

Figure 1 is a side elevation, and Fig. 2 is a longitudinal section, of my improved plate-holder.

The same parts are referred to by similar letters in each figure.

The nature of the said invention consists in the use of a clamp actuated by the combined operation of a screw-rod and cam-piece, whereby the screw on the rod furnishes the means for holding plates slightly varying in size, while the cam-piece, acting on the screw-rod as the same is turned, becomes a ready means for clamping the plate to the holder or releasing the same therefrom.

In the drawings, $a$ is a block which I prefer to be of wood, having a metal end $b$ and lip 1 formed thereon, which lip is level, or nearly so, with the face of the block $a$, and said block $a$ is removed beneath the edge of the lip 1, so as to form a groove, into which one end of the plate is to be entered, as at 2 2, Fig. 1.

$c$ is a metal rod passing through the end $b$ and block $a$, and formed with a bow or handle $d$ at one end, and the other end has a screw-thread cut thereon, which enters a nut on the movable end or clamp $e$, that is provided with lips 3 4 on its sides similar to the lip 1, and also with steady-pins running into holes in the ends of the block $a$, around which are helical springs tending to force said clamp $e$ away from the block $a$. (See dotted lines at 5 5, Fig. 1.) The daguerreotype-plate to be held while being buffed or polished is entered at one end beneath the lip 1 and the other end pressed to the block $a$, so that the lip 3 of the clamp $e$ can be drawn by means of the bow $d$ over the same to hold the plate in place and to retain the bow $d$ and clamp $e$. I make use of a beveled or cam-shaped piece $f$, attached to the end $b$, over which one side of the bow $d$ is turned, and should the plate not be held sufficiently tight the rod $c$ is to be screwed into the clamp $e$, which tightens the lip 3 in its hold on the plate, and when the plate is to be removed by simply giving the bow $d$ and rod $c$ a quarter-turn the bow is removed from over the cam-piece $f$, and the springs throw the clamp $e$ sufficiently away from the end of the block $a$ to allow the plate to be removed.

In order to adapt my holder to two sizes of plates, I attach on one side thereof a strip of metal $g$ with a lip formed beneath its edge, so as to receive a smaller plate 5 between said lip and the lip 4 on the clamp $e$, the same being held by the rod $c$, bow $d$, and cam-piece $f$, as before described.

In buffing or cleaning daguerreotype-plates the greatest difficulty arises in bringing the middle part of the plate to the requisite polish, because several of the holders tend to depress the middle and elevate the edge of the plate; but the reverse is the case with my holder, for although the block $a$ is to be level the lips coming over the edge or ends of the plate act to spring up the center. Thereby the operation of cleaning is more perfectly performed, and it will also be seen that my holder is adapted to two or more sizes of plates. Thereby the number of holders used in a daguerreotype establishment can be proportionately decreased, and the holder is adapted to any slight variation in the size of the plate. The construction is simple and cheap and very convenient and efficient in its operation.

What I claim, and desire to secure by Letters Patent, is—

The combination of the clamp $e$ with the screw-rod $c$, bow $d$, and cam-piece $f$, to hold the daguerreotype-plate between and beneath the lips 1 and 3 or 4 and $g$, in the manner and as specified.

In witness whereof I have hereunto set my signature this 27th day of September, 1855.

S. S. DAY.

Witnesses:
    LEMUEL W. SERRELL,
    THOMAS G. HAROLD.